United States Patent
Griess et al.

(10) Patent No.: US 8,652,606 B2
(45) Date of Patent: Feb. 18, 2014

(54) COMPOSITE STRUCTURES HAVING COMPOSITE-TO-METAL JOINTS AND METHOD FOR MAKING THE SAME

(75) Inventors: Kenneth Harlan Griess, Kent, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 12/857,835

(22) Filed: Aug. 17, 2010

(65) Prior Publication Data
US 2012/0045606 A1    Feb. 23, 2012

(51) Int. Cl.
*B32B 3/14*    (2006.01)
*B32B 3/18*    (2006.01)

(52) U.S. Cl.
USPC ............................................. 428/60; 428/58

(58) Field of Classification Search
USPC .................... 428/58, 60, 61; 73/587
See application file for complete search history.

(56) References Cited

U.S. PATENT DOCUMENTS

| | | |
|---|---|---|
| 3,711,934 A | 1/1973 | Zorowski et al. |
| 3,780,929 A | 12/1973 | Terrasi |
| 4,072,516 A | 2/1978 | Pepper et al. |
| 4,229,473 A | 10/1980 | Elber |
| 4,334,124 A | 6/1982 | Imsand et al. |
| 4,498,139 A | 2/1985 | Malinovsky |
| 4,524,620 A * | 6/1985 | Wright et al. ............ 73/587 |
| 4,666,546 A | 5/1987 | Treber |
| 4,849,913 A | 7/1989 | Ward et al. |
| 4,907,164 A | 3/1990 | Guyder |
| 5,006,990 A | 4/1991 | Ward et al. |
| 5,031,457 A | 7/1991 | Kline |
| 5,038,291 A | 8/1991 | Wang et al. |
| 5,119,309 A | 6/1992 | Cavendish et al. |
| 5,216,612 A | 6/1993 | Cornett et al. |
| 5,452,407 A | 9/1995 | Crook |
| 5,500,272 A | 3/1996 | Padden |
| 5,984,511 A | 11/1999 | Vasey-Glandon et al. |
| 6,030,483 A | 2/2000 | Wilson |
| 6,041,132 A | 3/2000 | Isaacs et al. |
| 6,052,631 A | 4/2000 | Busch et al. |
| 6,138,056 A | 10/2000 | Hardesty et al. |
| 6,253,218 B1 | 6/2001 | Aoki et al. |
| 6,278,457 B1 | 8/2001 | Bernardini et al. |
| 6,341,261 B1 | 1/2002 | Vasey-Glandon et al. |
| 6,356,437 B1 | 3/2002 | Mitchell et al. |
| 6,407,738 B1 | 6/2002 | Wakabayashi |

(Continued)

FOREIGN PATENT DOCUMENTS

| EP | 1050396 A1 | 11/2000 |
|---|---|---|
| EP | 1296103 A2 | 3/2003 |

(Continued)

OTHER PUBLICATIONS

Machine translation of EP1082217 retrieved Oct. 31, 2012.*

(Continued)

*Primary Examiner* — Alexander Thomas
(74) *Attorney, Agent, or Firm* — Yee & Associates, P.C.

(57) ABSTRACT

A composite structure comprises stacked sets of laminated fiber reinforced resin plies and metal sheets. Edges of the resin plies and metal sheets are interleaved to form a composite-to-metal joint connecting the resin plies with the metal sheets.

20 Claims, 5 Drawing Sheets

(56) References Cited

U.S. PATENT DOCUMENTS

| | | |
|---|---|---|
| 6,445,390 B1 | 9/2002 | Aftosmis et al. |
| 6,484,776 B1 | 11/2002 | Meilunas et al. |
| 6,502,489 B2 | 1/2003 | Gerent et al. |
| 6,625,618 B1 | 9/2003 | Arai |
| 6,629,302 B2 | 9/2003 | Miura et al. |
| 6,690,159 B2 | 2/2004 | Burreson et al. |
| 6,799,081 B1 | 9/2004 | Hale et al. |
| 6,819,966 B1 | 11/2004 | Haeberli |
| 6,843,565 B2 | 1/2005 | Evans et al. |
| 6,879,872 B2 | 4/2005 | Fukumura |
| 6,959,235 B1 | 10/2005 | Abdel-Malek et al. |
| 7,006,087 B2 | 2/2006 | Takagi |
| 7,010,472 B1 | 3/2006 | Vasey-Glandon et al. |
| 7,058,472 B2 | 6/2006 | Mathews et al. |
| 7,076,323 B2 | 7/2006 | Vanderwiel |
| 7,079,996 B2 | 7/2006 | Stewart et al. |
| 7,099,725 B2 | 8/2006 | Murrish et al. |
| 7,159,112 B1 | 1/2007 | Williams |
| 7,171,344 B2 | 1/2007 | Lind |
| 7,243,055 B2 | 7/2007 | Chen et al. |
| 7,244,230 B2 | 7/2007 | Duggirala et al. |
| 7,300,693 B2 | 11/2007 | Albers et al. |
| 7,324,103 B2 | 1/2008 | Stewart et al. |
| 7,365,747 B2 | 4/2008 | Finlayson et al. |
| 7,366,643 B2 | 4/2008 | Verdura et al. |
| 7,376,480 B2 | 5/2008 | Hagen et al. |
| 7,407,556 B2 | 8/2008 | Oldani et al. |
| 7,423,523 B2 | 9/2008 | Green |
| 7,424,543 B2 | 9/2008 | Rice, III |
| 7,513,965 B2 | 4/2009 | Oldani et al. |
| 7,526,418 B2 | 4/2009 | Pita et al. |
| 7,545,274 B2 | 6/2009 | Coop |
| 7,555,404 B2 | 6/2009 | Brennan et al. |
| 7,561,996 B2 | 7/2009 | Lu et al. |
| 7,617,029 B2 | 11/2009 | Loda |
| 7,651,756 B2 | 1/2010 | Albers et al. |
| 7,720,561 B2 | 5/2010 | Tang et al. |
| 7,747,421 B2 | 6/2010 | Tang et al. |
| 7,751,917 B2 | 7/2010 | Rees et al. |
| 7,761,183 B2 | 7/2010 | Sullivan |
| 7,761,713 B2 | 7/2010 | Baar |
| 7,769,481 B2 | 8/2010 | Tang et al. |
| 7,809,454 B2 | 10/2010 | Hu et al. |
| 7,809,531 B2 | 10/2010 | Murrish |
| 7,809,679 B2 | 10/2010 | Nixon et al. |
| 7,810,025 B2 | 10/2010 | Blair et al. |
| 7,823,062 B2 | 10/2010 | Liberty et al. |
| 7,869,982 B2 | 1/2011 | Drumheller et al. |
| 7,875,333 B2 * | 1/2011 | Stephan ............... 428/60 |
| 7,912,602 B2 | 3/2011 | Sells et al. |
| 7,983,809 B2 | 7/2011 | Kell et al. |
| 8,103,101 B2 | 1/2012 | Fujiwara et al. |
| 8,108,058 B2 | 1/2012 | Murrish et al. |
| 8,165,703 B2 | 4/2012 | Burgos Gallego et al. |
| 8,209,838 B2 | 7/2012 | Lindgren |
| 8,285,407 B2 | 10/2012 | Kessel et al. |
| 2001/0045148 A1 | 11/2001 | Gerent et al. |
| 2001/0047508 A1 | 11/2001 | Miura et al. |
| 2002/0077752 A1 | 6/2002 | Burreson et al. |
| 2002/0077968 A1 | 6/2002 | Kaniwa et al. |
| 2002/0174010 A1 | 11/2002 | Rice, III |
| 2002/0183986 A1 | 12/2002 | Stewart et al. |
| 2003/0055812 A1 | 3/2003 | Williams et al. |
| 2003/0080957 A1 | 5/2003 | Stewart et al. |
| 2003/0120472 A1 | 6/2003 | Lind |
| 2003/0145017 A1 | 7/2003 | Patton et al. |
| 2003/0191554 A1 | 10/2003 | Russell et al. |
| 2004/0021828 A1 | 2/2004 | Evans et al. |
| 2004/0024661 A1 | 2/2004 | Freel et al. |
| 2004/0139330 A1 | 7/2004 | Baar |
| 2004/0147840 A1 | 7/2004 | Duggirala et al. |
| 2004/0177060 A1 | 9/2004 | Nixon et al. |
| 2004/0236561 A1 | 11/2004 | Smith et al. |
| 2005/0055181 A1 | 3/2005 | Verdura et al. |
| 2005/0119774 A1 | 6/2005 | Murrish et al. |
| 2005/0240291 A1 | 10/2005 | Oldani et al. |
| 2005/0241261 A1 | 11/2005 | Martinez-Cepeda |
| 2005/0247396 A1 | 11/2005 | Oldani et al. |
| 2006/0015777 A1 | 1/2006 | Loda |
| 2006/0041840 A1 | 2/2006 | Blair et al. |
| 2006/0119601 A1 | 6/2006 | Finlayson et al. |
| 2006/0265198 A1 | 11/2006 | Kanai et al. |
| 2006/0291724 A1 | 12/2006 | Fujiwara et al. |
| 2007/0073429 A1 | 3/2007 | Rees et al. |
| 2007/0106418 A1 | 5/2007 | Hagen et al. |
| 2007/0150087 A1 | 6/2007 | Tang et al. |
| 2007/0191982 A1 | 8/2007 | Sullivan |
| 2007/0236354 A1 | 10/2007 | Green |
| 2007/0241908 A1 | 10/2007 | Coop |
| 2007/0244590 A1 | 10/2007 | Menayo et al. |
| 2008/0286600 A1 * | 11/2008 | Vecchio et al. ............... 428/600 |
| 2008/0312764 A1 | 12/2008 | Murrish |
| 2009/0005928 A1 | 1/2009 | Sells et al. |
| 2009/0043533 A1 | 2/2009 | Brennan et al. |
| 2009/0076638 A1 | 3/2009 | Hu et al. |
| 2009/0112540 A1 | 4/2009 | Kessel et al. |
| 2009/0112820 A1 | 4/2009 | Kessel et al. |
| 2009/0112973 A1 | 4/2009 | Kessel et al. |
| 2009/0138139 A1 | 5/2009 | Tsai et al. |
| 2010/0042283 A1 | 2/2010 | Kell et al. |
| 2010/0161095 A1 | 6/2010 | Lindgren |
| 2011/0082681 A1 | 4/2011 | Teramae et al. |
| 2011/0087463 A1 | 4/2011 | Nakhle et al. |

FOREIGN PATENT DOCUMENTS

| | | |
|---|---|---|
| EP | 1503301 A2 | 2/2005 |
| EP | 1840775 A1 | 10/2007 |
| JP | 2000298734 A | 10/2000 |
| JP | 2004264993 A | 9/2004 |
| JP | 2006350499 A | 12/2006 |
| WO | 0056541 A1 | 9/2000 |
| WO | WO2009055201 A2 | 4/2009 |
| WO | WO2009070410 A1 | 6/2009 |
| WO | WO2010019328 A1 | 2/2010 |
| WO | WO2011046686 A1 | 4/2011 |
| WO | PCT/US2011/041519 | 6/2011 |
| WO | 2012024023 A1 | 2/2012 |

OTHER PUBLICATIONS translation of WO 00/056541 by google downloaded May 29, 2013.*
Griess et al., "Multi-Layer Metallic Structure and Composite-to-Metal Joint Methods," USPTO U.S. Appl. No. 13/443,687, filed Apr. 2012, 55 pages.
International Search Report and Written Opinion of the International Searching Authority, dated Aug. 5, 2011, regarding Application No. PCT/US2011/041519 (WO2012024023), 10 pages.
Fink et al., "Hybrid CFRP/titanium bolted joints: Performance assessment and application to a spacecraft payload adaptor," Composites Science and Technology, Feb. 2010, vol. 70, Issue 2, pp. 305-317.
Kolesnikov et al., "CFRP/titanium hybrid materials for improving composite bolted joints," Composites Structures, Jun. 2008, vol. 83, No. 4, pp. 368-380.
Griess et al., "Composite Structures Having Composite-To-Metal Joints and Method for Making the Same," USPTO U.S. Appl. No. 13/716,171 and Preliminary Amendment, filed Dec. 16, 2012, 39 pages.
Notice of Allowance, dated Jan. 15, 2013, regarding USPTO U.S. Appl. No. 12/192,168, 19 pages.
International Search Report and Written Opinion of the International Searching Authority, dated Mar. 5, 2009, regarding Application No. PCT/US2008/081793, 14 pages.
International Search Report, dated Jun. 8, 2009, regarding Application No. PCT/US2008/078095, 4 pages.
International Search Report and Written Opinion of the International Searching Authority, dated Oct. 15, 2009, regarding Application No. PCT/US2009/049931, 12 pages.
International Search Report and Written Opinion of the International Searching Authority, dated Jan. 25, 2011, regarding Application No. PCT/US2010/047886, 13 pages.

(56) References Cited

OTHER PUBLICATIONS

Cera et al., "Role-based viewing envelopes for information protection in collaborative modeling," Computer-Aided Design, Col. 36, No. 9, Aug. 2004, pp. 873-886.

Ding et al., "XML-based Representation in Product Lifestyle Management," Proceedings of the 2007 11th International Conference on Computer Supported Cooperative Work in Design (CSCWD 2007), Apr. 2007, pp. 762-767.

Guillermin et al., "Advanced CAD Software Tools for Cost-Effective Composite Engineering," Proceedings of the 46th International SAMPE Symposium, vol. 2, May 2001, pp. 1899-1910.

Kanga, "Application of Intelligent Computer-Aided Design Techniques to Power Plant Design and Operation," IEEE Transactions on Engergy Conversion, vol. EC-2, No. 4, Dec. 1987, pp. 592-597.

Li et al., "Research on the collaborative virtual products development on Web and X3D," Proceedings of the 16th International Conference on Artificial Reality and Telexistence (ICAT '06), Nov. 2006, pp. 141-144.

Prakash, "Autolay—a GUI-based design and development software for laminated composite components," Computers & Graphics, vol. 23, No. 1, Feb. 1999, pp. 95-110.

Prakash et al., "Computer Graphics in the Design and Manufacture of Composite Laminate Components," Computers & Graphics, Col. 17, No. 4, Jul. 1993, pp. 407-413.

Office Action, dated Apr. 29, 2011, regarding USPTO U.S. Appl. No. 11/945,121, 16 pages.

Final Office Action, dated Oct. 28, 2011, regarding USPTO U.S. Appl. No. 11/945,121, 15 pages.

Office Action, dated Sep. 9, 2010, regarding USPTO U.S. Appl. No. 11/924,107, 25 pages.

Final Office Action, dated Dec. 27, 2010, regarding USPTO U.S. Appl. No. 11/924,107, 21 pages.

Office Action, dated Dec. 7, 2011, regarding USPTO U.S. Appl. No. 11/924,107, 32 pages.

Notice of Allowance, dated Jul. 20, 2012, regarding USPTO U.S. Appl. No. 11/924,107, 18 pages.

Office Action, dated Jul. 20, 2011, regarding USPTO U.S. Appl. No. 12/192,162, 29 pages.

Final Office Action, dated Nov. 9, 2011, regarding USPTO U.S. Appl. No. 12/192,162, 14 pages.

Notice of Allowance, dated Feb. 17, 2012, regarding USPTO U.S. Appl. No. 12/192,162, 9 pages.

Notice of Allowance, dated May 21, 2012, regarding USPTO U.S. Appl. No. 12/192,162, 16 pages.

Office Action, dated Apr. 5, 2011, regarding USPTO U.S. Appl. No. 12/192,168, 21 pages.

Final Office Action, dated Sep. 30, 2011, regarding USPTO U.S. Appl. No. 12/192,168, 13 pages.

Office Action, dated Aug. 3, 2012, regarding USPTO U.S. Appl. No. 12/192,168, 27 pages.

Althof, et al., "Investigations of Cemented and Detachable Joints of Fiber Reinforced Plastics," Translation of "Untersuchungen an geklebten and loesbaren Verbindungen von faserverstaerkten Kunststoffen," Kunststoffe, vol. 60, No. 12, 1970, pp. 911-916, NASA Technical Translation, NASA TT F-14,041, Dec. 1971, 19 pages.

Fink, et al., "Hybrid Titanium Composite Material Improving Composite Structure Coupling," In: Proceedings of the 20th AAAF Colloquium, Materials for Aerospace Applications, Nov. 2003, 7 pages.

\* cited by examiner

COMPOSITE STRUCTURES HAVING COMPOSITE-TO-METAL JOINTS AND METHOD FOR MAKING THE SAME

TECHNICAL FIELD

This disclosure generally relates to composite structures, especially to fiber reinforced resin laminates, and deals more particularly with a hybrid composite having a composite-to-metal joint.

BACKGROUND

Bonding techniques are often used to assemble composite structures. In applications where the composite structure also requires fasteners, the local thickness or gauge of the structure surrounding the fastener may need to be increased in order to withstand loads transmitted through the fastener joint. As the local thickness of the structure increases, the fastener may need to be lengthened, thereby adding weight to the structure. Additionally, the increased local thickness of the structure may increase the eccentricity of the load path across the fastener joint, which may place undesired bending loads on the fastener.

One solution to the problems mentioned above consists of attaching metal fittings to the composite structure in the area of the fasteners. These metal fittings may be formed of titanium or similar metals that may not substantially chemically react with carbon fiber reinforced composites in which they are in contact. Titanium fittings, however may be relatively expensive, particularly when it is necessary to form them into complex shapes.

Accordingly, there is a need for a composite resin-to-metal joint that may be used to connect substantially all metal fittings with substantially all composite resin structures, which is relatively inexpensive and easy to manufacture, and which may withstand loads transferred around fastener connection points. There is also a need for a composite resin-to-metal joint that substantially avoids chemical reactions between the all metal fitting and the all composite resin structure.

SUMMARY

The disclosed embodiments provide a hybrid-type composite structure that includes a fiber reinforced resin composite-to-metal joint that may be used to connect a substantially all-metal fitting with a substantially all composite resin structure. The joint provides a transition between the composite and metallic structures that is suitable for use in higher performance applications, such as aerospace vehicles. This transition from a substantially all composite to a substantially all metal material may reduce or eliminate the possibility of corrosion and/or problems stemming from eccentricity. During lay-up of the composite structure, sheets of metal are substituted for a number of composite plies, and the transition from composite plies to metal sheets occurs at staggered locations so as to provide adequate load transfer from the composite portion to the metal portion. The staggered transition results in an interleaving between the composite plies and the metal sheets and creates multiple bond lines that may reduce the occurrence and/or propagation of cracks or disbonds in the joint. An adhesive placed between the metal sheets binds and unitizes the sheets into a nearly solid metal fitting.

According to one disclosed embodiment, a composite structure is provided, comprising a laminated stack of fiber reinforced resin plies and a stack of metal sheets. The metal sheets have edges that are interleaved with the edges of the fiber reinforced resin plies to form a composite-to-metal joint connecting the fiber reinforced resin plies with the metal sheets.

According to another embodiment, a hybrid resin-metal structure is provided comprising a composite resin portion, a metal portion, and a transition section between the resin and metal portions. The resin portion includes laminated plies of fiber reinforced resin, and the metal portion includes bonded sheets of metal. The transition section includes staggered overlaps between the laminated plies and the metal sheets.

According to another embodiment, a hybrid composite metal part is provided. The part comprises a layup of fiber reinforced composite material that is terminated at an interface location. At the interface location, a metal ply of the same thickness as the composite material continues to the metal edge of the part, and the layup is repeated with a composite to metal interface that is staggered toward the edge of the part from the prior interface location. A ply of structural adhesive is placed between the metal plies, with the next metal to composite interface staggered away from the part edge to produce a nested splice, and the staggered interface stacking produces nested tabs is continued to the full thickness of the part with none of the composite plies extending fully to the edge of the part.

According to still another embodiment, a method is provided of fabricating a composite structure. The method comprises forming a multi-ply composite lay-up having a composite portion and a metal portion, and forming a composite-to-metal joint between the composite portion and the metal portion. The method further includes compacting and curing the layup.

According to a further embodiment, a method is provided to produce a hybrid metal part. The method comprises laying at least one fiber reinforced composite ply that is terminated at a interface location, and laying an adjacent metal ply where the metal ply is of substantially the same thickness as the adjacent fiber reinforced composite ply. The steps of laying composite plies and adjacent metal plies are repeated to form a composite to metal interface that is staggered toward said an edge of the part from the prior interface location. The method further comprises laying a ply of structural adhesive between the metal plies, and repeating the composite and metal ply layup where the next metal to composite interface is staggered away from the part edge to produce a nested splice.

BRIEF DESCRIPTION OF THE ILLUSTRATIONS

DETAILED DESCRIPTION

Figure 1:
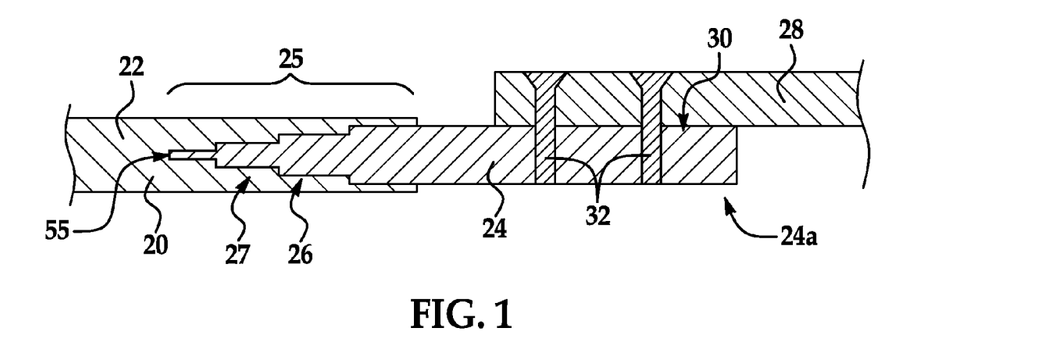
FIG. 1 is an illustration of a sectional view of a composite structure having a composite-to-metal joint.

Referring first to FIG. 1, a hybrid composite structure 20 includes a composite resin portion 22 joined to a metal portion 24 by a transition section 25 that includes a composite-to-metal joint 26. In the illustrated example, the composite structure 20 is a substantially flat composite sheet, however depending upon the application, the structure 20 may have one or more curves, contours or other geometric features. For example, composite structure 20 may comprise an inner and/or outer contoured skin of an aircraft (not shown) which is secured to a frame 28 portion of the aircraft by means of a lap joint 30 and fasteners 32 which pass through the skin 20 into the frame 28.

The frame 28 may comprise a composite, a metal or other rigid material, and the metal portion 24 of the structure 20 may serve as a rigid metal fitting 24 that is suited to transfer a range of loads and types of loadings between the frame 28 and the composite portion 20. As will be discussed below in more detail, the metal portion 24 may comprise any of various metals such as, without limitation, titanium that is substantially non-reactive to and compatible with the composite portion 20 and the structure 28. In one practical embodiment for example, and without limitation, the composite resin portion 22 may comprise a carbon fiber reinforced epoxy, the metal portion 24 may comprise a titanium alloy, and the frame 28 may comprise an aluminum alloy or a composite. The transition section 25 and the joint 26 are strong enough to carry the typical range and types of loads between the composite resin portion 22 and the metal portion 24, including but not limited to tension, bending, torsion and shear loads. Although the illustrated transition section 25 and joint 26 are formed between an all composite resin portion 22 and the all metal portion 24, it may be possible to employ them to join two differing composite structures (not shown) or two differing metal structures (not shown).

Referring to FIGS. 1-4, a layup of composite material plies 35 is terminated at a interface location 39 referred to later herein as a transition point 39, where a metal sheet or ply 37 of the substantially the same thickness as the composite material plies 35 continues to the metal edge 24a of the metal portion 24, and the layup is repeated with a composite-to-metal interface 39 that is staggered toward the metal edge 24a from the prior interface location 39 and includes a ply of structural metal adhesive 45 (see FIGS. 5 and 6) between the metal plies 37, with the next metal-to-composite interface 39 staggered away from the part edge 24a to produce a nested splice 27. This staggered interface stacking, which produces nested tabs 29 (see FIG. 3), is continued to the full thickness of the hybrid composite structure 20 with none of the composite plies 35 extending fully to the metal edge 24a of the all metal portion 24

Figure 2:
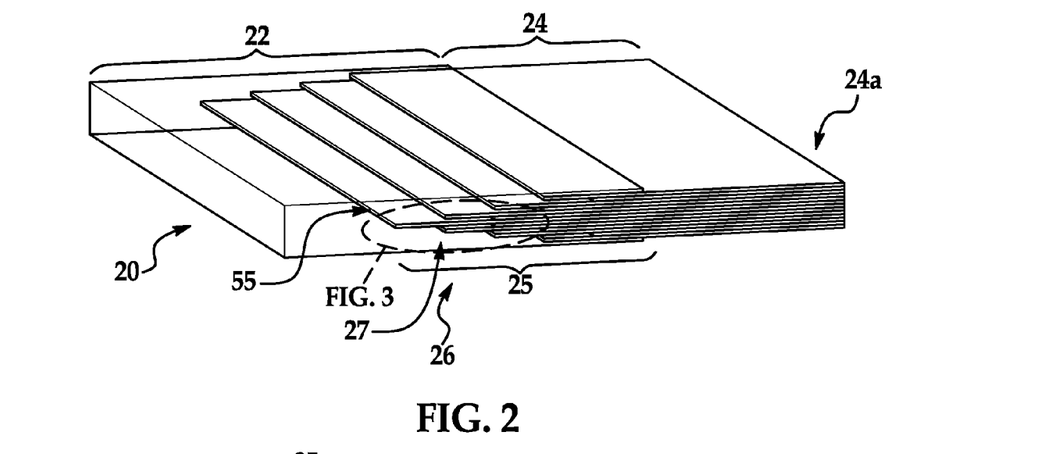
FIG. 2 is an illustration of a perspective view of the composite structure including the composite-to-metal joint.
Figure 3:
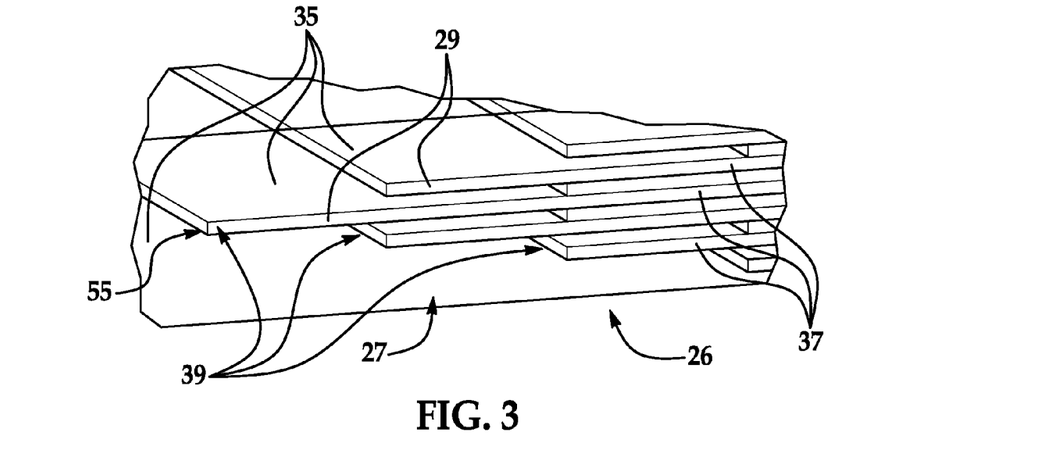
FIG. 3 is an illustration of a perspective view of the area designated as FIG. 3 in FIG. 2.
Figure 4:
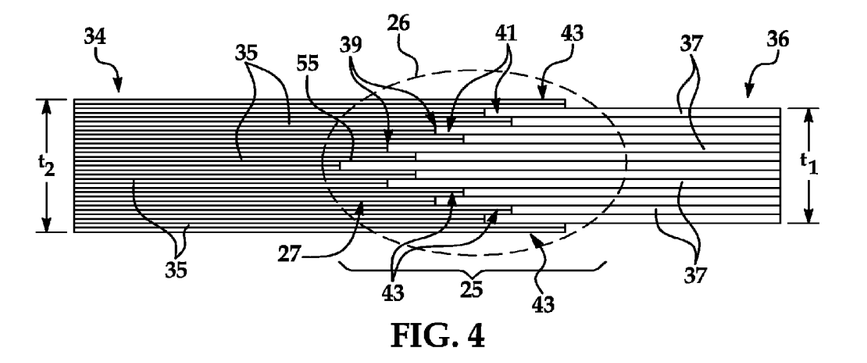
FIG. 4 is an illustration of a cross sectional view of the joint, better showing interleaving between composite plies and the metal sheets.
Figure 5:
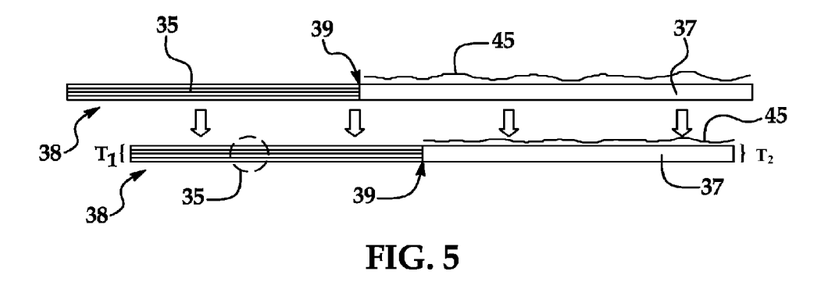
FIG. 5 is an illustration of a cross sectional view of two separated layers of the joint shown in FIG. 4, also showing the application of a film adhesive on the metal sheets.
Figure 6:
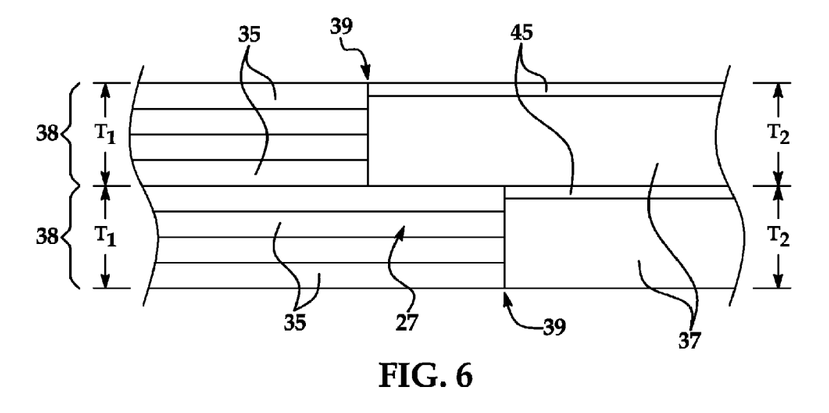
FIG. 6 is an illustration of an enlarged, cross sectional view of a portion of the joint formed by the two layers shown in FIG. 5.

Referring now also to FIGS. 2-4, the composite portion 22 of the structure 20 comprises a laminated stack of fiber reinforced resin plies 35, and the metal portion 24 of the structure 20 comprises a stack 36 of metal sheets or plies 37 that are bonded together to form a substantially unitized metal structure. As shown in FIGS. 5 and 6, the composite plies 35 and the metal sheets 37 are arranged in layers 38. Each of the layers 38 comprises one or more of the composite plies 35 in substantially edge-to-edge abutment with one of the metal sheets 37. Thus, each of the layers 38 transitions at a point 39 from a composite i.e. composite resin plies 35, to a metal, i.e. metal sheet 37.

The transition points 39 are staggered relative to each other according to a predetermined lay-up schedule such that the plies 35 and the metal sheets 37 overlap each other in the transition section 25 (FIG. 1). Staggering of the transition points 39 creates multiple bond lines that may reduce the occurrence and/or propagation of cracks or disbonds in the joint 26. The staggering of the transition points 39 also results in a form of interleaving of the composite plies 35 and the metal sheets 37 within the joint 26 which forms a nested splice 27 between the all composite portion 22 and the all metal portion 24. This nested splice 27 may also be referred to as a finger bond 26, a finger joint 26 or a multiple step lap joint 26. The adjacent ones of the transition points 39 are spaced from each other in the in-plane direction of the structure 20 so as to achieve a bonded joint 26 that exhibits optimum performance characteristics, including strength and resistance to disbonds and propagation of inconsistencies such as cracks. In the illustrated example, the nested splice 27 forming the joint 26 is a form of a double finger joint 26 in which the transition points 39 are staggered in opposite directions from a generally central point 55 of maximum overlap. However, other joint configurations are possible including but not limited to a single finger joint in which the multiple transition points 39 are staggered in a single direction.

The composite plies 35 may comprise a fiber reinforced resin, such as without limitation, carbon fiber epoxy, which may be in the form of unidirectional prepreg tape or fabric. Other fiber reinforcements are possible, including glass fibers, and the use of non-prepreg materials may be possible. The composite plies 35 may have predetermined fiber orientations and are laid up according to a predefined ply schedule to meet desired performance specifications. As previously mentioned, the bonded sheets 37 may comprise a metal such as titanium that is suitable for the intended application. In the illustrated example, the stack 36 of metal sheets 37 has a total thickness $t_1$ which is generally substantially equal to the thickness $t_2$ of the laminated stack 34 of plies 35. In the illustrated example however, $t_2$ is slightly greater than $t_1$ by a factor of the thickness of several overwrap plies 43 on opposite sides of the stack 37.

FIGS. 5 and 6 illustrate details of two adjoining layers 38 of the joint 26 shown in FIGS. 2-4. In this example, each layer 38 comprises four plies 35 having a collective total thickness $T_1$. The individual metal sheets 37 of the adjacent layers 38 are bonded together by means of a layer of structural adhesive 45, which may comprise a commercial film adhesive or other forms of a suitable adhesive that is placed between the metal sheets 36 during the lay-up process.

The combined thickness of each metal sheet 37 and one layer of adhesive 45 represented as T2 in FIG. 5 is substantially equal to the thickness T1 of the composite plies 35 in the layer 38. Although not shown in the Figures, a thin film of adhesive may be placed between the plies 35 to increase the interlaminar bond strength. In one practical embodiment, titanium alloy metal sheets 37 may be used which each have a thickness of approximately 0.025 inches, the film adhesive 45 may be approximately 0.005 inches thick, and four composite carbon fiber epoxy plies 35 may be used in each layer 38 having a collective total thickness of about 0.030 inches. Depending on the application, the use of metals other than titanium may be possible. The distance between adjacent transition points 39, and thus the length of the overlap between the layers 38, as well as the thickness and number of composite plies 35 and the thickness of the metal sheets 37 will depend on the requirements of the particular application, including the type and magnitude of the loads that are to be transmitted through the joint 26, and possibly other performance specifications.

The differing layers 38 of the joint 26 between the two differing materials of the composite and metal portions 22, 24 respectively (FIG. 1), render the structure 20 well suited to nondestructive evaluations of bond quality using embedded or mounted sensors (not shown). Ultrasonic structural waves (not shown) may be introduced into the structure 20 at the edge of the metal portion 24, at the composite portion 22 or in the transition section 25. These ultrasonic waves travel through what amounts to a waveguide formed by the metal 37 sheets and the interfaces (not shown) between the composite plies 35 and the metal sheets 37. MEMS-based (microelectromechanical) sensors, thin piezo-electric sensors (not shown) or other transducers placed in the structure 20 may be used to receive the ultrasonic structural waves for purposes on analyzing the condition of the bondlines in the joint 26.

Figure 7:
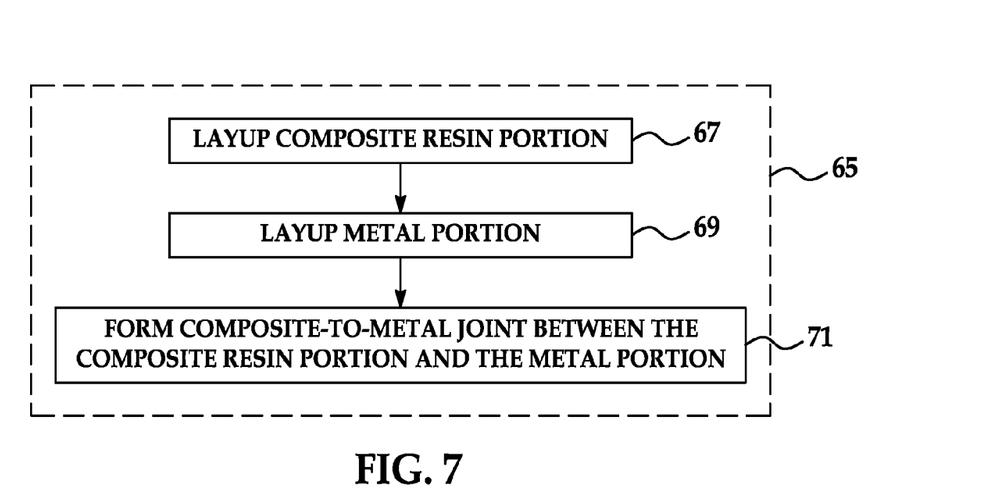
FIG. 7 is an illustration of a broad flow diagram of a method of making a composite structure having the composite joint shown in FIGS. 2-4.

Referring now to FIG. 7, one method of making the composite structure 20 comprises forming a multi-layer composite lay-up as shown at 65. Forming the lay-up includes laying up a composite resin portion 22 at step 67, and laying up a metal portion 24 at 69. The step 65 of forming the layup further includes forming a composite-to-metal joint between the composite resin portion and the metal portion of the lay-up, shown at 71.

Figure 8:
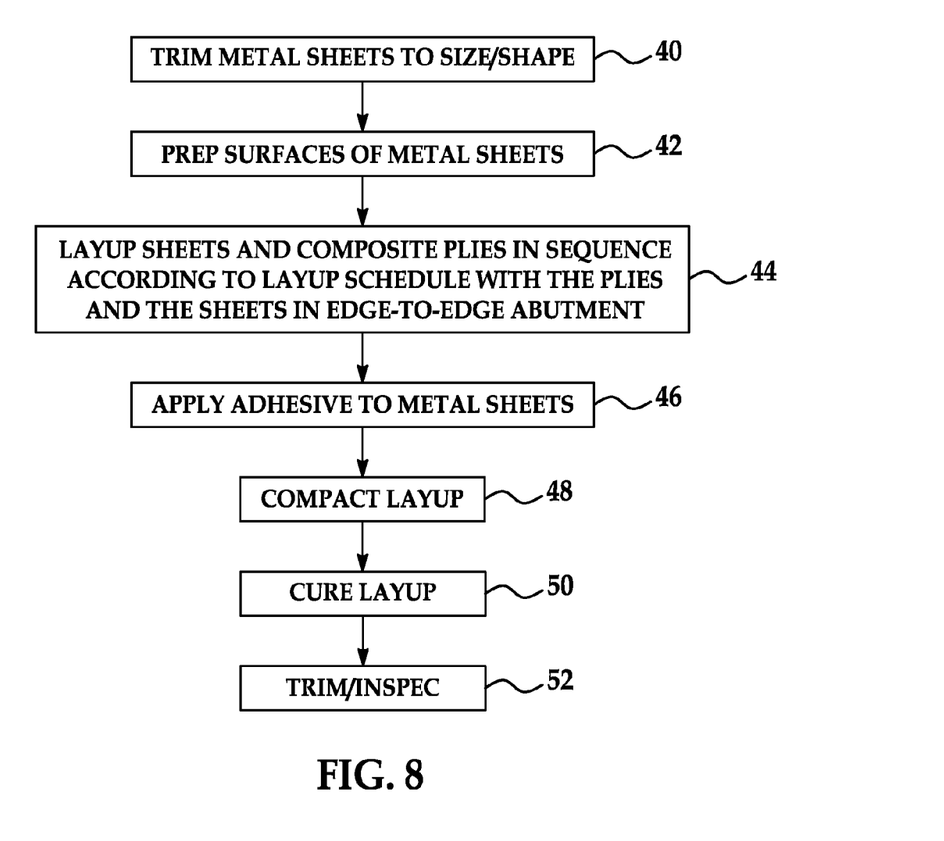
FIG. 8 is an illustration of a flow diagram showing additional details of the method shown in FIG. 7.

FIG. 8 illustrates additional details of the method shown in FIG. 7. Beginning at step 40, individual metal sheets 37 are trimmed to a desired size and/or shape. Next at 42, the surfaces of the metal sheets 37 are prepared by suitable processes that may include cleaning the sheets 37 with a solvent, drying them, etc. then at 44, the lay-up is assembled by laying up the metal sheets 36 and the composite plies 35 in a sequence that is determined by a predefined ply schedule (not shown) which includes a predetermined staggering of the transition points 39 between the plies 35 and the metal sheet 36 in each layer 38.

During the lay-up process, the metal sheets 37 are sequenced like plies into the lay-up, much like composite plies are sequenced into a lay-up in a conventional lay-up process. As shown at step 46, adhesive may be introduced between the metal sheets 37 in order to bond them together into a unitized metal structure. Similarly, although not shown in FIG. 8, a bonding adhesive may be introduced between the individual composite plies 35 in order to increase the bond strength between these plies 35. Next, at 48, the lay-up may be compacted using any of several known compaction techniques, such as vacuum bagging following which the lay-up is cured at step 50 using autoclave or out-of-autoclave curing processes. At step 52, the cured composite structure 20 may be trimmed and/or inspected, as necessary.

Figure 9:
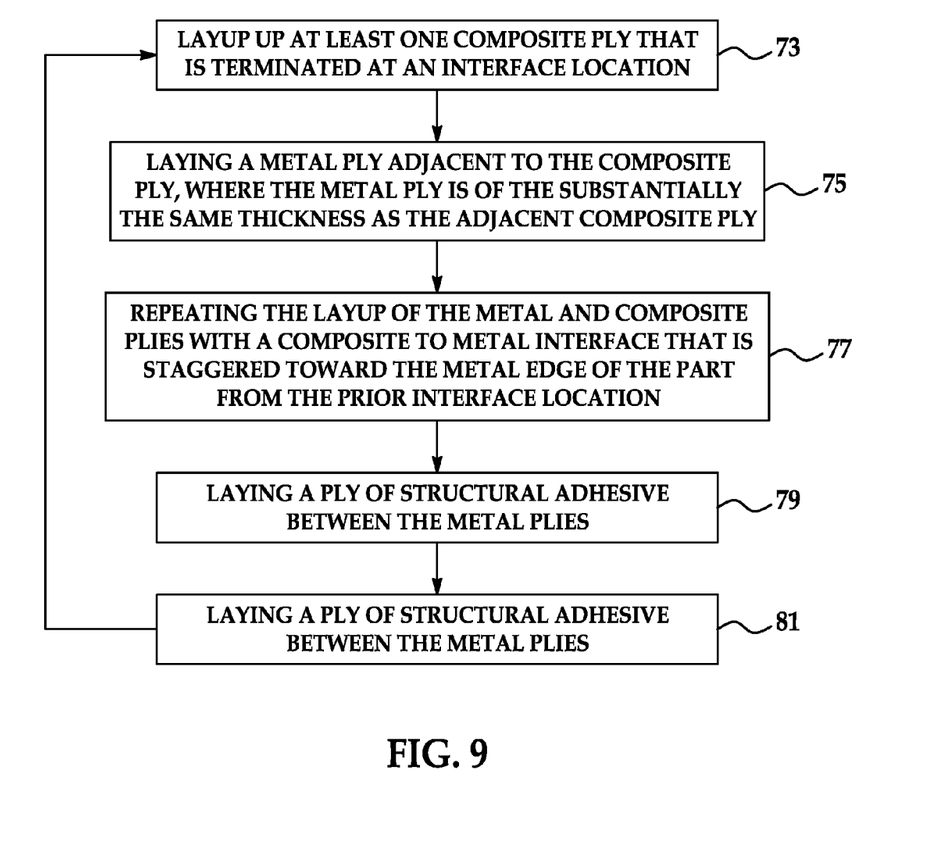
FIG. 9 is a flow diagram of another method of making a composite structure having the composite joint shown in FIGS. 2-4.

FIG. 9 illustrates still another embodiment of a method of making a hybrid composite part 20. The method begins at step 73 with laying at least one composite ply 35 that is terminated at an interface location 39 on a suitable layup tool (not shown). At 75, an adjacent metal ply 37 is laid up which is substantially the same thickness as the adjacent composite material play 35. As shown at 77, the layup process is repeated with a composite-to-metal interface 39 that is staggered toward the metal edge 24a of the part 20 from the prior interface location 39. A 79, a ply 45 of structural adhesive is laid between the metal plies 37. Steps 73-79 are repeated successively to produce a nested splice 27 and a staggered interface stacking forming nested tabs 29 to the full thickness of the hybrid part 20, with none composite plies 35 extending fully to the metal edge 24a of the part 20. Although not shown in FIG. 9, the completed layup is vacuum bagged processed to remove voids, and is subsequently cured using any suitable curing method.

Figure 10:
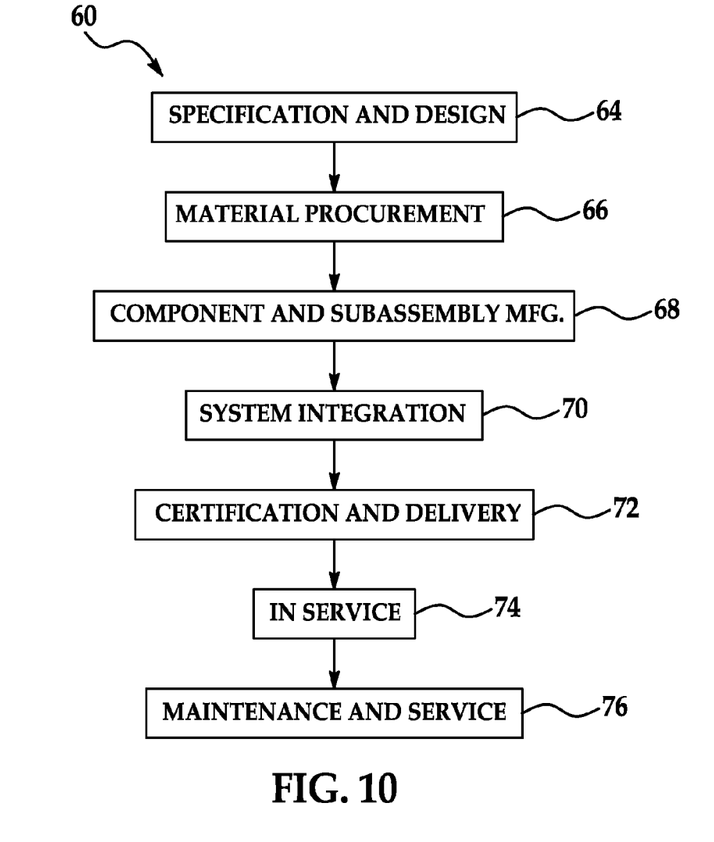
FIG. 10 is an illustration of a flow diagram of aircraft production and service methodology.
Figure 11:
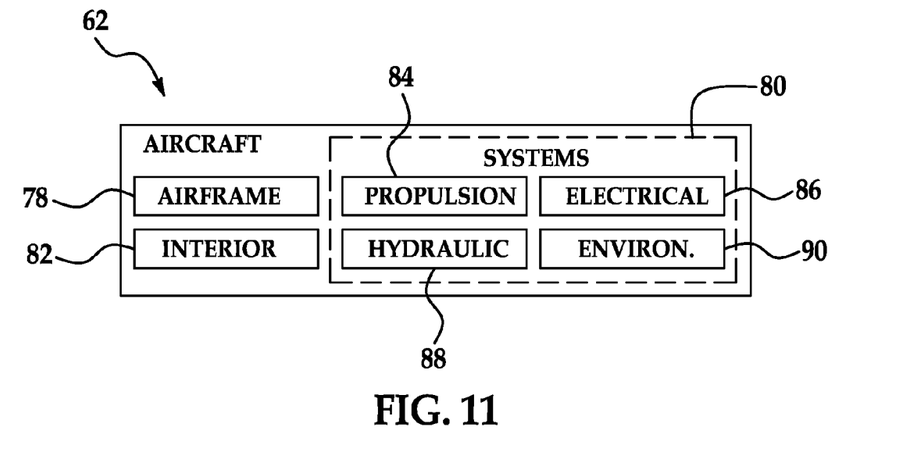
FIG. 11 is an illustration of a block diagram of an aircraft.

Embodiments of the disclosure may find use in a variety of potential applications, particularly in the transportation industry, including for example, aerospace, marine and automotive applications. Thus, referring now to FIGS. 10 and 11, embodiments of the disclosure may be used in the context of an aircraft manufacturing and service method 60 as shown in FIG. 10 and an aircraft 62 as shown in FIG. 11. Aircraft applications of the disclosed embodiments may include, for example, a wide variety of structural composite parts and components, especially those requiring the use of fasteners during the assembly process. During pre-production, exemplary method 60 may include specification and design 64 of the aircraft 62 and material procurement 66. During production, component and subassembly manufacturing 68 and system integration 70 of the aircraft 62 takes place. Thereafter, the aircraft 62 may go through certification and delivery 72 in order to be placed in service 74. While in service by a customer, the aircraft 62 is scheduled for routine maintenance and service 76 (which may also include modification, reconfiguration, refurbishment, and so on).

Each of the processes of method 60 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 62 produced by exemplary method 60 may include an airframe 78 with a plurality of systems 80 and an interior 82. Examples of high-level systems 82 include one or more of a propulsion system 84, an electrical system 86, a hydraulic system 88, and an environmental system 90. Any number of other systems may be included. The disclosed method may be employed to fabricate parts, structures and components used in the airframe 78 or in the interior 82. Although an aerospace example is shown, the principles of the disclosure may be applied to other industries, such as the marine and automotive industries.

Systems and methods embodied herein may be employed during any one or more of the stages of the production and service method 60. For example, parts, structures and components corresponding to production process 68 may be fabricated or manufactured in a manner similar to parts, structures and components produced while the aircraft 62 is in service. Also, one or more apparatus embodiments, method embodiments, or a combination thereof may be utilized during the production stages 68 and 70, for example, by substantially expediting assembly of or reducing the cost of an aircraft 62. Similarly, one or more of apparatus embodiments, method embodiments, or a combination thereof may be utilized while the aircraft 62 is in service, for example and without limitation, to maintenance and service 76.

Although the embodiments of this disclosure have been described with respect to certain exemplary embodiments, it is to be understood that the specific embodiments are for purposes of illustration and not limitation, as other variations will occur to those of skill in the art.

What is claimed:

1. A composite structure, comprising:
   a first laminated stack of fiber reinforced resin plies; and
   a second stack of metal sheets, configured to form a composite-to-metal finger joint connecting the first laminated stack of fiber reinforced resin plies with the second stack of metal sheets, such that the second stack of metal sheets consists of metal sheets and an adhesive layer between each metal sheet, such that the metal sheets comprise at least one of: a titanium sheet, and a titanium alloy sheet, and such that an end of each metal sheet in the second stack of metal sheets abuts an end of multiple fiber reinforced resin plies from the first laminated stack, and the second stack of metal sheets configured to comprise, with an interface between the first laminated stack of fiber reinforced resin plies and the second stack of metal sheets, a waveguide for ultrasonic waves.

2. The composite structure of claim 1, wherein:
   the first stack of fiber reinforced resin plies and the second stack of metal sheets are arranged in layers, wherein each of the layers includes a first metal sheet and at least one of the fiber reinforced resin plies.

3. The composite structure of claim 2, wherein a first thickness of the fiber reinforced resin plies in each of the layers is generally equal to a second thickness of the first metal sheet in the layer.

4. The composite structure of claim 2, wherein:
   the at least one of the fiber reinforced resin plies and the first metal sheet in each of the layers having substantially abutting edges forming a resin-to-metal transition point in each of the layers.

5. The composite structure of claim 4, wherein the transition point in each of the layers is staggered relative to each other.

6. The composite structure of claim 2, wherein the layers form a fiber reinforced resin-to-metal finger joint between the first laminated stack of fiber reinforced resin plies and the second stack of metal sheets.

7. The composite structure of claim 1, wherein:
   the metal sheets consist of the titanium alloy, and
   the fiber reinforced resin plies comprise carbon.

8. The composite structure of claim 1, further comprising at least one of: a microelectromechanical sensor, a piezo-electric sensor, and a transducer.

9. A hybrid composite resin-metal structure, comprising:
   a composite resin portion comprising laminated plies of fiber reinforced resin;
   a metal portion consisting of metal sheets and an adhesive layer between each of the metal sheets, such that the metal sheets comprise at least one of: titanium, and a titanium alloy; and
   a transition section between the composite resin portion and the metal portion, the transition section including staggered overlaps between the laminated plies and the metal sheets, configured such that an end of each of the metal sheets abuts an end of multiple laminated plies, and the staggered overlaps comprise a waveguide configured to support nondestructive evaluations of a bond quality in the composite resin metal structure.

10. The hybrid composite resin-metal structure of claim 9, wherein:
    the laminated plies and the metal sheets are arranged in layers, and
    each of the layers includes one of the metal sheets and a plurality of the laminated plies in substantially edge-to-edge abutment.

11. The hybrid composite resin-metal structure of claim 10, wherein a first thickness of the laminated plies in each of the layers is substantially equal to a second thickness of the metal sheet in the layer.

12. The hybrid composite resin-metal structure of claim 9, wherein the staggered overlaps form a composite-to-metal finger joint between the composite resin portion and the metal portion.

13. The hybrid composite resin-metal structure of claim 9, further comprising a layer of adhesive between each of the metal sheets for bonding the sheets together and unitizing the metal portion.

14. The hybrid composite resin-metal structure of claim 9, wherein each of the metal sheets consists of the titanium alloy.

15. A hybrid composite metal part having a full thickness, comprising:
    a layup of multiple plies of a fiber reinforced composite material having a first thickness, the layup terminating at an interface location; and
    a metal sheet of the first thickness, in a stack that consists of: metal sheets, and an adhesive layer between each metal sheet, such that an end of each metal sheet in the stack abuts an end of multiple fiber reinforced composite plies, such that the metal sheet comprises at least one of: titanium, and a titanium alloy, and continues to a metal edge of the hybrid composite metal part, and the layup is repeated with a composite to metal interface that is staggered toward the metal edge of the part from the interface location and includes a ply of structural adhesive between each sheet in the stack, with the next metal to composite interface staggered away from the metal edge of the hybrid composite metal part to produce a nested splice, and the staggered interface stacking produces nested tabs continuing to the full thickness of the hybrid composite metal part with no metal sheet in the stack extending fully to an edge opposite the metal edge of the hybrid composite metal part, the stack configured to comprise a waveguide comprising the interface location and the stack.

16. The hybrid composite metal part of claim 15, further comprising a sensor configured to receive an ultrasonic wave.

17. A hybrid composite resin-metal aircraft structure, comprising:
    a plurality of laminated layers forming a fiber reinforced, all composite portion;
    a unitized metal portion consisting of a plurality of metal sheets and an adhesive layer, the adhesive layer, being between at least a first metal sheet and a second metal sheet within the plurality of metal sheets, configured to unitize the first and the second metal sheets, such that each metal sheet abuts multiple plies of composite resin; and
    a hybrid composite-metal finger joint connecting the composite portion with the unitized metal portion, each layer within the plurality of laminated layers including a plurality of plies of composite resin; such that the metal sheets consist of at least one of: titanium, and a titanium alloy, and wherein the plurality of plies and the plurality of metal sheets are arranged in edge-to-edge abutment with each other forming a composite-to-metal transition point, the plurality of metal sheets configured to comprise a waveguide with the composite-to-metal transition point, and wherein the plurality of laminated layers comprises a plurality of transition points in the plurality of laminated layers such that the plurality of transition points are configured staggered relative to each other to form the hybrid composite-metal finger joint.

18. The hybrid composite resin-metal aircraft structure of claim 17, further comprising a transducer configured to receive an ultrasonic wave.

19. The transducer of claim 18, wherein the transducer comprises at least one of: a microelectromechanical sensor and a piezo-electric sensor.

20. A composite structure, comprising:
a first stack of laminated fiber reinforced resin plies;
a second stack consisting of: metal sheets, and an adhesive layer between each adjacent metal sheet, configured to form a composite-to-metal joint connecting the first laminated stack of fiber reinforced resin plies with the second stack, such that each metal sheet consists of at least one of: titanium, and a titanium alloy, and such that an end of each metal sheet in the second stack abuts ends of multiple laminated fiber reinforced plies in the first stack, and the second stack comprised by a waveguide configured to facilitate nondestructive evaluations of a bond quality of the composite structure; and
a sensor configured to receive an ultrasonic wave.

* * * * *